June 2, 1942.  E. R. BERGMANN  2,284,718
DRIVE MECHANISM FOR SHAKER CONVEYERS
Filed Jan. 23, 1941
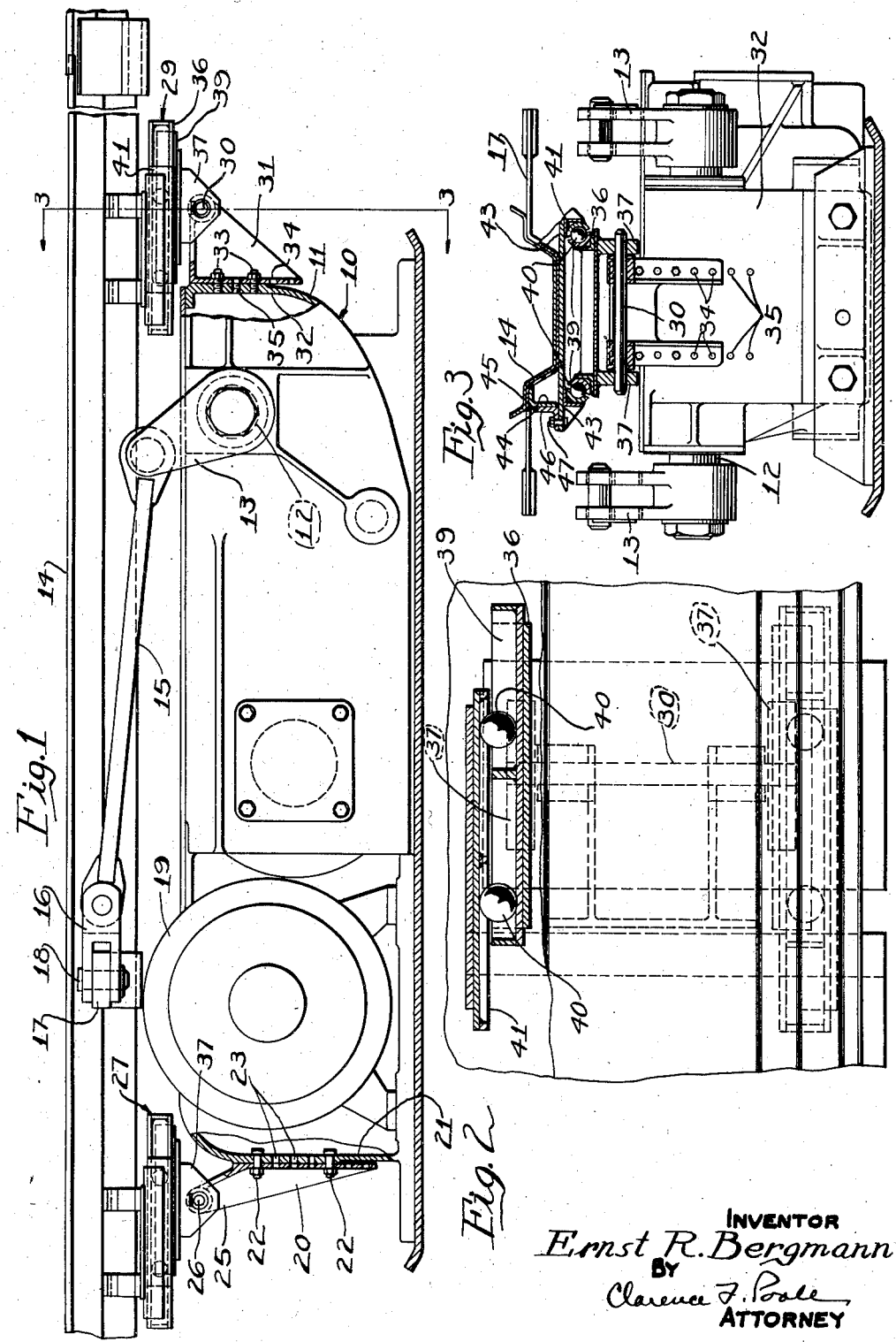
INVENTOR
Ernst R. Bergmann
BY
Clarence F. Poole
ATTORNEY Patented June 2, 1942

2,284,718

UNITED STATES PATENT OFFICE 2,284,718

DRIVE MECHANISM FOR SHAKER CONVEYERS

Ernst R. Bergmann, Evergreen Park, Ill., assignor to Goodman Manufacturing Company, Chicago, Ill., a corporation of Illinois Application January 23, 1941, Serial No. 375,607

3 Claims. (Cl. 198—220)

This invention relates to improvements in drive mechanisms for shaker conveyers and more particularly relates to improvements in supporting means for a driving trough of a shaker conveyer trough line on the conveyer drive mechanism.

Heretofore the driving troughs of shaker conveyer trough lines have been supported on the upper ends of a plurality of parallel rocking arms. Such a support is objectionable in that it causes an upward movement of the driving trough during each stroke of the conveyer. This places undue stresses on this trough and the other troughs on the trough line and their connecting bolts, causing breakage of the troughs and bolts, and likewise increases the load on the drive mechanism. Driving troughs also have formerly been supported on guide frames. These guide frames are heavy reciprocably movable frames with a central guide, for guiding the frame against lateral displacement. Such frames, however, must be mounted on heavy frameworks separate from the drive mechanism, and be securely held in place by means of jacks or the like.

The principal objects of my invention are to remedy these difficulties by providing a simplified mounting and guiding means for a driving trough of a shaker conveyer trough line on the conveyer drive mechanism, so arranged as to permit the trough to be driven by the drive mechanism in the plane of the trough line, and to eliminate vertical movement of the driving trough with respect to the trough line, during reciprocation thereof.

Other objects of my invention will appear from time to time as the following specification proceeds and with reference to the accompanying drawing wherein:

Figure 1 is a view in side elevation of a shaker conveyer drive mechanism having a driving trough of the trough line mounted thereon in accordance with my invention, with certain parts of the drive mechanism broken away and certain other parts shown in section, in order to more clearly illustrate certain details of my invention;

Figure 2 is an enlarged detail view showing a part of the driving trough in plan with certain parts of said trough broken away and certain parts of the supporting means therefor in horizontal section; and Figure 3 is a fragmentary transverse sectional view taken substantially along line 3—3 of Figure 1.

Referring now in particular to the drawing, a shaker conveyer drive mechanism generally indicated by reference character 10 is provided. Said drive mechanism may be of any usual type and is herein preferably shown as including a casing 11 having a rocking shaft 12 journaled therein adjacent one end thereof and projecting from opposite sides thereof. A pair of rocking arms 13, 13 are mounted on opposite ends of said shaft and are connected with a driving trough 14 of a shaker conveyer trough line, by means of driving links 15, 15. Said driving links are pivotally connected between the free ends of said rocking arms and clevis members 16, 16, which are pivoted to opposite ends of a connecting bar 17 by means of vertical pins 18, 18. Said connecting bar is herein shown as extending beneath and projecting laterally from opposite sides of said driving trough section in a plane disposed closely adjacent the center of forces on said trough section. A motor 19 is provided to reciprocably drive said rocking arms through suitable reduction gearing and through a suitable system of links and levers of a well known type. Said gearing and linkage arrangement are not herein shown or described since they form no part of my present invention.

Referring now in particular to the novel form of supporting connection for the driving trough 14 on the casing for the drive mechanism, a bracket 20 is detachably mounted on an end wall 21 of said drive casing by means of nuts and bolts 22, 22. An opening (not shown) is provided to the inside of said end wall, to permit access to said bolts. Said bolts are adapted to register with any one of a plurality of apertures 23, 23 formed in said end wall and bracket, to permit vertical adjustment of said bracket. Said bracket includes a pair of laterally spaced upright arms 25, 25 having a shaft 26 mounted thereon, which forms a pivotal support for a ball and guide frame generally indicated by reference character 27.

Another ball frame 29 is provided adjacent the end of said drive mechanism opposite from the ball frame 27. Said ball frame is mounted on a transverse shaft 30 supported in a bracket 31, secured to an end wall 32 of said casing opposite from the end wall 21, by means of nuts and studs generally indicated by reference character 33. A plurality of apertures 34, 34 are provided in said bracket, and a plurality of threaded apertures 35, 35 are provided in said end wall 32 of said casing, to permit vertical adjustment of said bracket.

The ball frames 27 and 29 are each of a similar construction, so a description of one will suffice for both. The ball frame 29 includes a lower frame member 36 provided with a pair of laterally spaced depending ears 37, 37 adapted to be mounted on the shaft 30 adjacent opposite ends thereof. A pair of longitudinally extending concave races 39, 39 extend along opposite sides of said lower frame member and are herein shown as being of a semi-cylindrical form, and are adapted to form lower inner races for a plurality of balls 40, 40. The upper outer races for said balls are formed from a pair of longitudinally extending semi-cylindrical members 41, 41, facing the races 39, 39 and adapted to engage the balls 40, 40 so that said balls may support said upper races on said lower races for reciprocable movement with respect thereto. Said upper races are connected together by a cross frame member 43, adapted to have the bottom of the trough 14 rest thereon. Said cross frame member is secured to said trough by means of depending angles 44, 44, secured to the underside of a lower shouldered portion 45 of said trough. The depending legs of said angles have vertical legs of angles 46, 46 secured thereto. The horizontal legs of said last mentioned angles have the cross frame member 43 secured thereto by means of suitable nuts and bolts 47, 47 (see Figure 3).

The ball frames 27 and 29 thus form antifriction supports for the trough 14 on the drive mechanism 10, and guide said trough against lateral displacement and permit said trough to reciprocate in the plane of the trough line, without raising and lowering the driving trough of the trough line during reciprocation of the conveyer, which forms a simplified self-contained mounting for the drive mechanism on the drive casing, which is adjustable for varying angles of inclination of the trough line, and which reduces the strains on the driving trough section and the other trough sections of the trough line and reduces the power required to reciprocably drive the trough line.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a support for a driving trough section of a shaker conveyer and in combination with a shaker conveyer drive mechanism having a casing, drive means connecting said drive mechanism with said driving trough section, for reciprocably driving said trough section, and means for adjustably supporting said driving trough section on opposite ends of said casing to conform to the conveyer trough line and for reciprocably guiding and holding said driving trough section from lateral and vertical displacement in all positions of adjustment of said trough section with respect to said casing and said drive means during reciprocation thereof including a pair of transversely pivoted ball frames adjustably supported on opposite ends of said casing and having said driving trough section secured thereto.

2. In a support for a driving trough section of a shaker conveyer and in combination with a shaker conveyer drive mechanism, a casing for said driving mechanism, drive means connecting said drive mechanism with said driving trough section, for reciprocably driving said trough section, and means for supporting said driving trough section on opposite ends of said casing to conform to the plane of the conveyer trough line and for reciprocably guiding and holding said driving trough section from lateral and vertical displacement in all positions of adjustment of said trough section with respect to said casing and said drive means during reciprocation thereof, including a pair of bracket members projecting forwardly and rearwardly of said casing and a pair of longitudinally spaced ball frames secured to the bottom of said driving trough section and transversely pivoted to said bracket members.

3. In a support for a driving trough section of a shaker conveyer and in combination with a shaker conveyer drive mechanism having a casing, drive means connecting said drive mechanism with said driving trough section, for reciprocably driving said trough section, means for adjustably supporting said driving trough section on opposite ends of said casing to conform to the plane of the conveyer trough line and for reciprocably guiding and holding said driving trough section from lateral and vertical displacement in all positions of adjustment of said trough section with respect to said casing and drive means, during reciprocation thereof, including a pair of transversely pivoted ball frames, each of said ball frames including an upper frame member and a lower frame member, and interengaging ball and guide members reciprocably supporting said upper frame member on said lower frame member and guiding said upper frame member from lateral and vertical displacement with respect to said lower frame member, said upper frame members being secured to the bottom of said driving trough section, and bracket members projecting from each end of said casing and adjustably mounted with respect thereto and forming pivotal mountings for said lower frame members.

ERNST R. BERGMANN.